(12) United States Patent
Fukuda

(10) Patent No.: US 7,876,398 B2
(45) Date of Patent: Jan. 25, 2011

(54) LIQUID CRYSTAL DISPLAY APPARATUS

(75) Inventor: Yutaka Fukuda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 529 days.

(21) Appl. No.: 11/979,436

(22) Filed: Nov. 2, 2007

(65) Prior Publication Data

US 2008/0106667 A1 May 8, 2008

(30) Foreign Application Priority Data

Nov. 7, 2006 (JP) .............................. 2006-301818

(51) Int. Cl.
  *G02F 1/1333* (2006.01)
  *G02F 1/1335* (2006.01)
(52) U.S. Cl. .............................. 349/67; 349/58; 349/70
(58) Field of Classification Search ............. 349/58–60, 349/70–71, 62, 67
  See application file for complete search history.

(56) References Cited

U.S. PATENT DOCUMENTS

2006/0103774 A1  5/2006 Han et al.
2006/0176420 A1* 8/2006 Choi et al. .................... 349/62

FOREIGN PATENT DOCUMENTS

| EP | 1 548 359 A1 | 6/2005 |
| JP | 2004-258236 | 9/2004 |
| JP | 2005-091821 | 4/2005 |
| KR | 1020040057784 A | 7/2004 |
| WO | 2006/123472 A1 | 11/2006 |

* cited by examiner

*Primary Examiner*—Andrew Schechter
*Assistant Examiner*—Michael P Mooney
(74) *Attorney, Agent, or Firm*—Morgan Lewis & Bockius LLP

(57) ABSTRACT

A liquid crystal display apparatus is configured such that protrusions penetrate through the through holes of the fitting portions of a reflection sheet, and such that each short side of a diffusion plate and a diffusion sheet stacked on the diffusion plate fits with the step portion of a light frame, and each long side thereof is in contact with the protrusion.

9 Claims, 3 Drawing Sheets

LIQUID CRYSTAL DISPLAY APPARATUS

This application is based on Japanese Patent Application No. 2006-301818 filed on Nov. 7, 2006, the contents of which are hereby incorporated by reference.

BACKGROUND OF THE INVENTION

1. Field of the Invention

The present invention relates to a liquid crystal display apparatus. More particularly, it relates to a mounting structure of an optical member such as a reflection sheet, a diffusion sheet, or a diffusion plate.

2. Description of Related Art

A liquid crystal display apparatus is of a thin type, is lightweight, and is low in power consumption, and is widely used for a notebook PC, a monitor for PC, a household TV set, or the like. The liquid crystal display apparatus transmits a light emitted from a backlight through a liquid crystal cell to form a picture. The liquid crystal display apparatus includes optical members such as a reflection sheet for reflecting a light emitted from the backlight, a diffusion plate for diffusing a light emitted from the backlight and a light reflected by the reflection sheet, and a diffusion sheet disposed in stacked relation with the diffusion plate, and for enhancing the diffusion effect of light.

In the liquid crystal display apparatus, the reflection sheet is attached to a rear frame by an adhesion sheet. After attaching the reflection sheet to the rear panel, a backlight is mounted. To the rear frame, the reflection sheet and the backlight are disposed, and a light frame for fixing the backlight is disposed. The diffusion plate and the diffusion sheet are mounted in the following configuration. The diffusion sheet is stacked on the diffusion plate, and the lamination is mounted on the light frame. In such a state, the lamination is pressed by a guide member from the top.

The display performance of the liquid crystal display apparatus largely changes according to the precision of position of the diffusion plate and the diffusion sheet with respect to the rear frame and the backlight. However, in a conventional liquid display apparatus, the reflection sheet, the diffusion plate, and the diffusion sheet are aligned for mounting. Thus, problems may occur in terms of structure or (and) performance due to variations in operation.

Under such circumstances, the invention described in JP-A-2005-91821 discloses the following liquid crystal display apparatus. Namely, the liquid crystal display apparatus includes a reflection sheet, a light source, a light guide plate, and optical sheets (diffusion sheet, prism sheet, and protective sheet) disposed between a main frame and a sub frame. The small projections formed on the main frame and the sub frame penetrate through the openings formed in the optical sheets, so that the optical sheets are aligned.

Whereas, the invention described in JP-A-2004-258236 discloses the following liquid crystal display apparatus. Namely, the liquid crystal display apparatus has a wall portion rising vertically from the outer peripheral portion of the rectangular bottom surface. It is configured such that the projections of a light guide plate and the projections of a liquid crystal display panel are inserted into the holes formed in the wall portion.

However, with the invention described in JP-A-2005-91821, the small projections are penetrated through the holes formed in a plurality of optical sheets. Therefore, holes must be opened in all the optical sheets, which takes time and effort. Further, the holes must be formed so as to be aligned precisely when a plurality of the optical sheets have been stacked one on another. This requires processing precision.

Still further, with the invention described in JP-A-2004-258236, the projections must be formed in the light guide plate and the liquid crystal display panel. Thus, manufacturing of the light guide plate and the liquid crystal display panel takes time and effort. Whereas, provision of the projections results in the complicated shape, which complicates the manner in which a force is exerted thereon. As a result, a stress may concentrate on an unexpected site, leading to breakage.

SUMMARY OF THE INVENTION

It is an object of the present invention to provide a liquid crystal display apparatus in which a reflection sheet, a diffusion plate, and a diffusion sheet can be disposed at accurate respective positions quickly when arranged, and accordingly, which is easy to assemble, and is less susceptible to occurrence of variations due to an assembly error.

It is another object of the present invention to provide a liquid crystal display apparatus in which a reflection sheet, a diffusion plate, and a diffusion sheet can be disposed at prescribed respective positions with accuracy, and the respective members can be controlled to the minimum necessary dimensions, and accordingly, which can reduce the manufacturing cost.

It is a still other object of the present invention to provide a liquid crystal display apparatus in which a reflection sheet, a diffusion plate, and a diffusion sheet can be prevented from being mounted in a displaced or distorted manner, and other members than the respective members can be mounted with ease and quickly.

A liquid crystal display apparatus in accordance with one embodiment of the present invention, includes: a rear frame formed by cutting and bending a metal plate, and including a rectangular bottom surface, rising portions vertically arranged respectively from both the long sides of the bottom surface, and support portions bent from the rising portions in parallel and outward; a reflection sheet mounted on the rear frame; a light frame including, on the underside, a holding portion for holding a backlight disposed above the reflection sheet; and a rectangular diffusion plate disposed on the light frame and the support portions, and for diffusing light;

characterized in that in the support portions, protrusions protruding upward are formed, the light frame has a step on the top side, and the diffusion plate is configured such that each short side fits with the step of the light frame, and such that a part of each long side is in contact with the protrusion of the rear frame.

With this configuration, it is possible to mount the diffusion plate at a prescribed mounting position with accuracy without using a specific member or using a specific method. This can reduce the occurrence of variations in display performance of the liquid crystal display apparatus due to the assembly error during manufacturing.

In a preferred embodiment of the present invention, the rear frame is formed by cutting and bending a metal plate, and the protrusions are formed by cutting and raising the support portions of the rear frame.

In another preferred embodiment of the present invention, on top of the diffusion plate, one or a plurality of diffusion sheets are disposed, and the diffusion sheets are also configured such that each short side fits with the step of the light frame, and such that a part of each long side is in contact with the protrusion of the rear frame.

In a still other embodiment of the present invention, the reflection sheet has fitting portions to fit with the protrusions, and the fitting portions are through holes.

With this configuration, it is possible to dispose the reflection sheet at a prescribed position of the rear frame with accuracy without using a fixing method such as adhesion. By disposing the reflection sheet at an accurate position, it is possible to enhance the reflection efficiency. In addition, it is possible to prevent the reflection sheet from becoming an obstacle when the members to be mounted on the rear frame such as a backlight and a light frame are disposed.

A liquid crystal display apparatus in accordance with another embodiment of the present invention includes: a rear frame formed by cutting and bending a metal plate, and including a rectangular bottom surface, rising portions vertically arranged respectively from both the long sides of the bottom surface, and support portions bent from the rising portions in parallel and outward; a reflection sheet mounted so as to be in close contact with the bottom surface, the rising portions, and the support portions of the rear frame; a backlight disposed above the reflection sheet, and having a U-shaped cathode-ray tube, a light frame including, on the underside, a holding portion for holding the backlight; a rectangular diffusion plate disposed on the light frame and the support portions, and for diffusing light, and two rectangular diffusion sheets disposed in stacked relation on the diffusion plate; a frame-like cell guide for pressing the outer peripheral portions of the diffusion plate with the diffusion sheets mounted thereon, and the diffusion sheets; a liquid crystal cell disposed above the cell guide, and including a liquid crystal sealed between a pair of glass substrates each with a transparent electrode mounted thereon; and a frame-like bezel for pressing the cell guide and the liquid crystal cell, characterized in that the support portions of the rear frame have protrusions protruding upward by being cut and raised, the reflection sheet has through holes formed for the protrusions to penetrate therethrough at portions at which it is in close contact with the supporting portions, the light frame has a step formed on the top side, and the diffusion plate and the diffusion sheets disposed in stacked relation on the diffusion plate are configured such that each short side fits with the step of the light frame, and such that a part of each long side is in contact with the protrusion.

DESCRIPTION OF THE PREFERRED EMBODIMENTS

Figure 1:
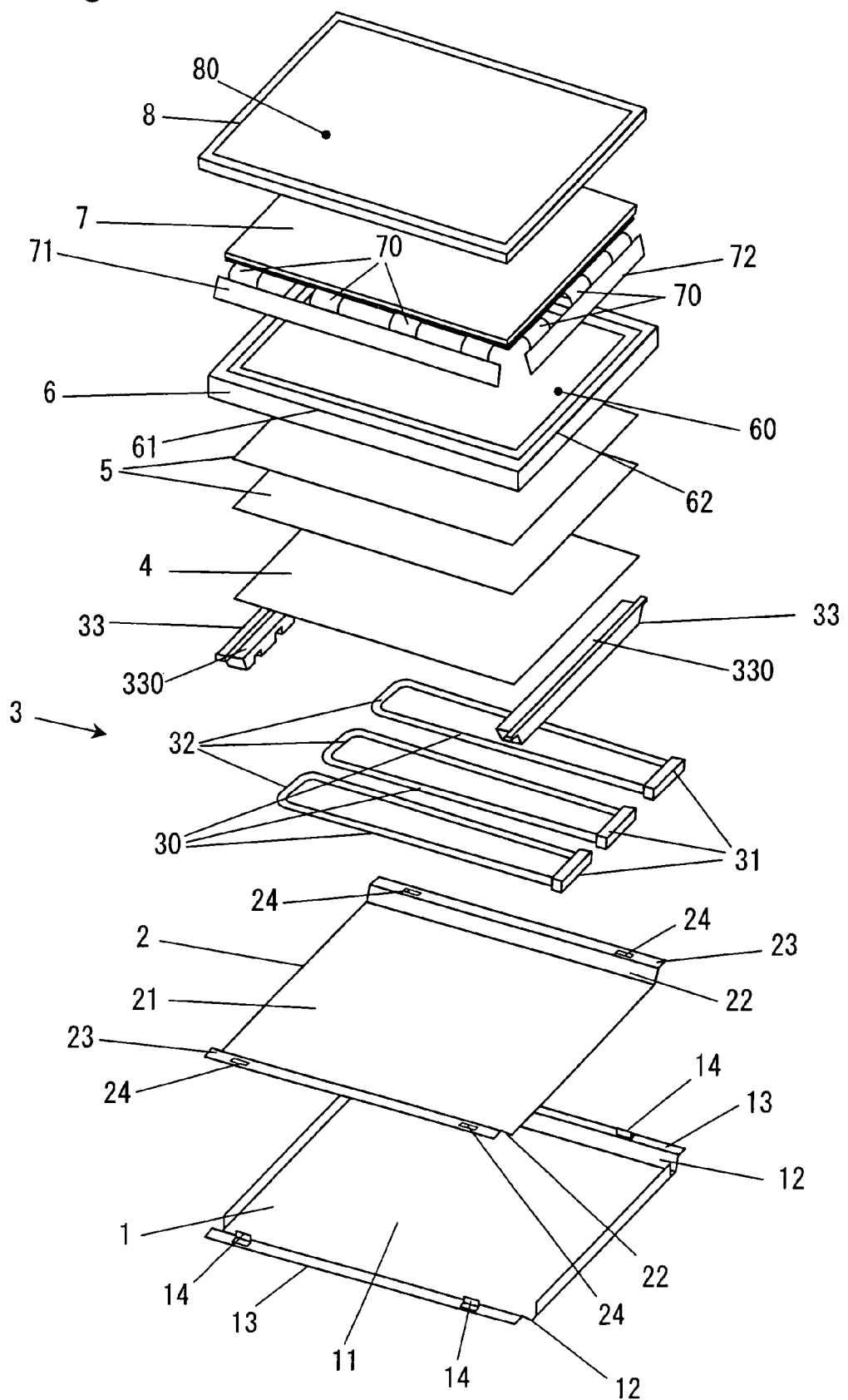
FIG. 1 is an exploded perspective view of one example of a liquid crystal display apparatus in accordance with the present invention.
Figure 2:
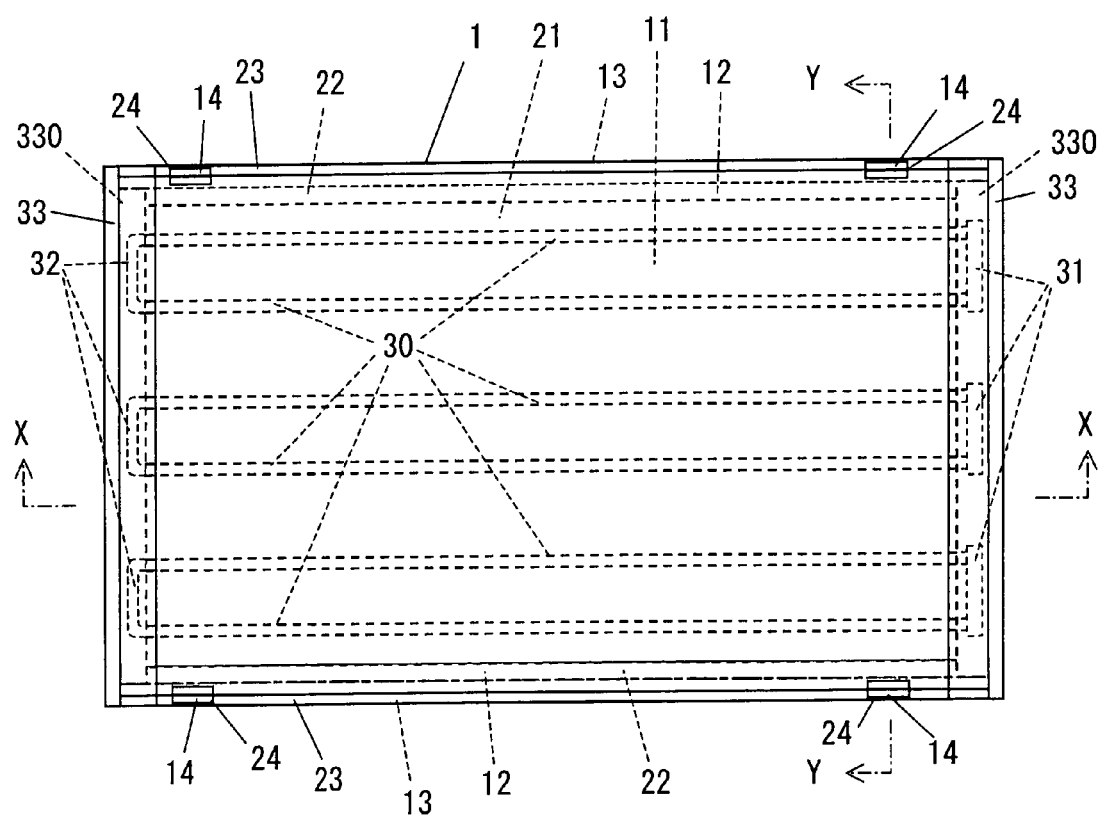
FIG. 2 is a plan view of the liquid crystal display apparatus shown in FIG. 1.
Figure 3:
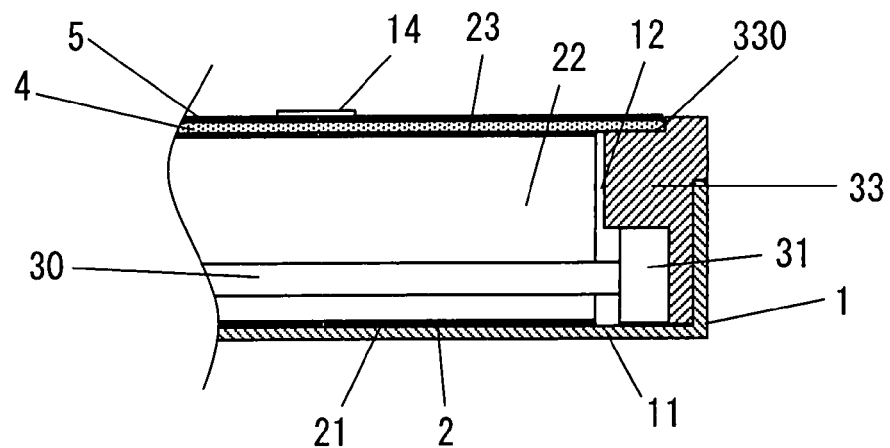
FIG. 3 is a cross sectional view of the liquid crystal display apparatus shown in FIG. 2 cut along cross section X-X.
Figure 4:
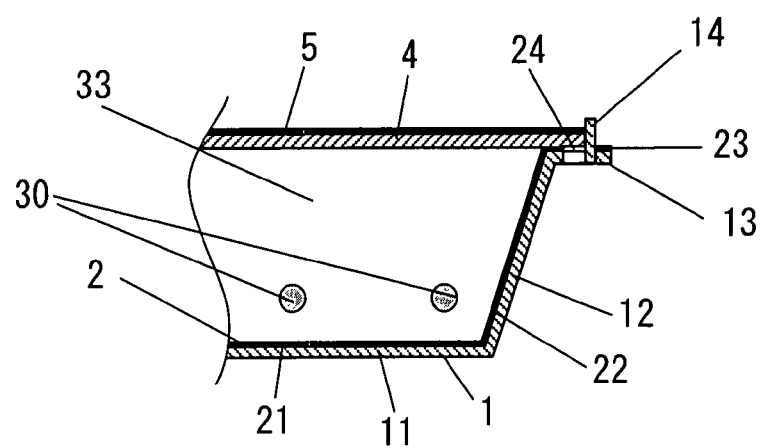
FIG. 4 is a cross sectional view of the liquid crystal display apparatus shown in FIG. 2 cut along cross section Y-Y.

Below, the present invention will be described by way of embodiments by reference to the accompanying drawings. FIG. 1 is an exploded perspective view of one example of a liquid crystal display apparatus in accordance with the present invention; FIG. 2 is a plan view of the liquid crystal display apparatus shown in FIG. 1; FIG. 3 is a cross sectional view of the liquid crystal display apparatus shown in FIG. 2 cut along cross section X-X; and FIG. 4 is a cross sectional view of the liquid crystal display apparatus shown in FIG. 2 cut along cross section Y-Y. In FIG. 2 to FIG. 4, a cell guide, a liquid crystal cell, and a bezel are not shown for convenience. The liquid crystal display apparatus shown in FIG. 1 includes a rear frame 1, a reflection sheet 2, a backlight 3, a diffusion plate 4, a diffusion sheet 5, a cell guide 6, a liquid crystal cell 7, and a bezel 8 stacked in this order.

The rear frame 1 is formed by cutting and bending a metal plate. The rear frame 1 has a bottom surface 11 in a rectangle form, rising portions 12 respectively rising obliquely outward from the edges of the long sides of the bottom surface 11, support portions 13 formed integrally with the respective tips of the rising portions 12 so as to be in parallel with the bottom surface 11, and protrusions 14 each protruding from each support portion 13. The rising portions 12 are formed so as to be connected to both of the two long sides of the bottom surface 11. Although not limited thereto, herein, a total of four protrusions 14 are provided, two on each support portion 13. The protrusions 14 are each formed by cutting and raising the support portion 13, and thus formed integrally with the support portion 13.

The reflection sheet 2 is mounted on the rear frame 1. The reflection sheet 2 has a main body portion 21 to be in close contact with the bottom surface 11, connection portions 22 each to be in close contact with the inner surface of each rising portion 12, and fitting portions 23 each to be in close contact with each support portion 13. The reflection sheet 2 is for reflecting a light ray to be emitted toward the rear frame 1 side out of the light rays emitted from the backlight 3 toward the liquid crystal cell 6 side. The connection portions 22 are respectively formed integrally with the two long sides of the main body portion 21, and two connection portions 22 are formed in the reflection sheet 2. Whereas, the fitting portions 23 are respectively formed integrally with the two connection portions 22.

The backlight 3 is a light source of the liquid crystal display apparatus. Although not limited thereto, herein, it has a U-shaped fluorescent light 30, and a socket 31 for holding both the edges of the fluorescent light 30, and supplying electric power. The fluorescent light 30 has a folded portion 32 at which the fluorescent light 30 is folded in a U shape at the middle. The backlight 3 is pressed by a light frame 33 at the vicinity of the folded portion 32 and at the vicinity of the socket 31, and is fixed to the rear frame 1. To the socket 31, a wire, although not shown, for supplying electric power is connected. Although not limited thereto, herein, the backlight 3 has three fluorescent lights 30.

The diffusion plate 4 has a rectangular shape, and disposed on top of the support portions 13 of the rear frame 1, and the light frame 33. The diffusion plate 4 diffuses a light emitted from the backlight 3, and a light reflected by the reflection sheet 2, and makes uniform the intensity of the light. The diffusion sheet 5 is the same rectangular sheet as the diffusion sheet 4, and disposed in stacked relation on the diffusion plate 4. The diffusion sheet 5 is for further enhancing the uniformity of a light from the diffusion plate 4. When the diffusion plate 4 capable of sufficiently enhancing the uniformity of light can be used, the diffusion sheet 5 may be omitted.

A cell guide 6 is mounted from above the diffusion plate 4 and the diffusion sheet 5 disposed on the support portions 13 of the rear frame 1 and the light frame 33, and it presses the diffusion plate 4 and the diffusion sheet 5. The cell guide 6 is formed of a resin, and it is a rectangular frame body formed by connecting long frame portions 61 and short frame portions 62. The cell guide 6 is a frame body, and presses the outer periphery portions of the diffusion plate 4 and the diffusion sheet 5. On the top side of the cell guide 6, a step portion is formed. The liquid crystal cell 7 is fitted in the step portion, and aligned. The cell guide 6 is fixed to the rear frame 1 and the light frame 33 by bolts. Further, the cell guide 6 has a frame-like shape, and has an opening 60 formed at the central portion.

A light diffused by the diffusion plate 4 and the diffusion sheet 5 is applied through the opening 60 at the center of the cell guide 6 to the liquid crystal cell 7. The liquid crystal cell 7 is configured such that a liquid crystal is sealed between glass substrates each with a transparent electrode disposed thereon. The liquid crystal cell 7 has a rectangular shape. To one long side thereof, a gate substrate 71 including a gate driver mounted thereon is mounted via a flexible substrate 70. Whereas, to one short side thereof, a source substrate 72 including a source driver mounted thereon is mounted via a flexible substrate 70. To the liquid crystal cell 7, an electric power is supplied from the gate substrate 71 and the source substrate 72, so that the liquid crystal sealed between the glass substrates is driven.

The bezel 8 has an opening 80 formed at the center. The bezel 8 is connected and fixed to the cell guide 6 by means of bolts not shown. Although not limited thereto, herein, it is formed by cutting and bending a metal plate. The bezel 8 is thus mounted on the cell guide 6, thereby to press the side edges of the liquid crystal cell 7 disposed on the cell guide 6.

As shown in FIG. 2 and FIG. 4, in the fitting portions 23 of the reflection sheet 2, through holes 24 are formed. A total of four through holes 24 are formed, two on each of the two fitting portions 23. When the reflection sheet 2 is mounted on the rear frame 1, the arrangement is made so that the protrusions 14 of the rear frame 1 penetrate the through holes 24. As a result, the reflection sheet 2 can be aligned at an accurate position with respect to the rear frame 1, in other words, at such a position as to result in good reflection efficiency. Further, each protrusion 14 penetrates through each through hole 24. Therefore, an adhesion portions for fixing the reflection sheet 2 to the rear frame 1 can be omitted, and time and effort for manufacturing can be omitted that much.

Further, adhesion is not performed, which can inhibit the reflection sheet 2 from being wrinkled due to shrinkage/expansion of an adhesion portions, insufficient mounting of the adhesion portions, or the like. Thus, arrangement can be made so that the reflection sheet 2 can sufficiently exhibit its capability that much. This can inhibit a reflected light from becoming ununiform, so that the liquid crystal display apparatus can perform stable display.

As shown in FIG. 3 and FIG. 4, the diffusion plate 4 is disposed so that each short side thereof fits into the step portion 330 formed in the light frame 33. The diffusion plate 4 is thus disposed in a fitting manner, and hence it will not shift in a long-side direction. Whereas, each long side of the diffusion plate 4 is in contact with the protrusions 14, and hence the diffusion plate 4 will not shift in a short-side direction. Thus, the diffusion plate 4 comes in contact with the step portion 330 of the light frame 33 and the protrusions 14, and thus it is aligned at an accurate position. Further, two diffusion sheets 5 disposed in stacked relation on the diffusion plate 4 are also similarly brought in contact with the step portion 330 of the light frame 33 and the protrusions 14, and thus aligned.

Thus, the step portion 330 of the light frame 33 and the protrusions 14 can align the diffusion plate 4 and the diffusion sheets 5. This can reduce the operation steps for performing alignment.

In the foregoing examples, a description was given by taking, as an example, the case using the fluorescent light 30 as the light source. However, the invention is not limited thereto. A light source capable of making enough light incident upon the liquid crystal cell 6 can be widely adopted. However, the one with a small heating value is preferable. Whereas, a description was given by taking, as an example, the one having the U-shaped fluorescent light 30 as the backlight 3 serving as a light source. However, the invention is not limited thereto. The one capable of making light incident upon the liquid crystal cell 6 sufficiently, and in such a manner as to prevent unevenness can be widely adopted. Further, as the liquid crystal display apparatus, a description was given by taking, as an example, the one having three backlights 3 serving as light sources. However, the invention is not limited thereto. The one having such a number of backlights 3 as to allow light to be incident upon the liquid crystal cell 6 sufficiently and in such a manner as to prevent unevenness can be widely adopted.

Up to this point, embodiments of the invention was specifically described. However, the invention is not limited to the embodiments, and various changes may be made within the scope not departing from the gist.

What is claimed is:

1. A liquid crystal display apparatus, comprising:
a rear frame formed by cutting and bending a metal plate, and including a rectangular bottom surface, rising portions vertically arranged respectively from both the long sides of the bottom surface, and support portions bent from the rising portions parallel to the bottom surface and outward;
a reflection sheet mounted on the rear frame;
a light frame including, on the underside, a holding portion for holding a backlight disposed above the reflection sheet; and
a rectangular diffusion plate disposed on the light frame and the support portions, and for diffusing light;
characterized in that
protrusions protruding upward from the support portions are provided,
a step is provided on the top side of the light frame,
the diffusion plate is configured such that each short side fits with the step of the light frame, and such that a part of each long side is in contact with the protrusion of the rear frame, and
the reflection sheet has fitting portions to fit with the protrusions.

2. The liquid crystal display apparatus according to claim 1,
characterized in that the rear frame is formed by cutting and bending a metal plate, and the protrusions are formed by cutting and raising the support portions of the rear frame.

3. The liquid crystal display apparatus according to claim 1,
characterized in that on top of the diffusion plate, one or a plurality of diffusion sheets are disposed, and the diffusion sheets are also configured such that each short side fits with the step of the light frame, and such that a part of each long side is in contact with the protrusion of the rear frame.

4. The liquid crystal display apparatus according to claim 2,
characterized in that on top of the diffusion plate, one or a plurality of diffusion sheets are disposed, and the diffusion sheets are also configured such that each short side fits with the step of the light frame, and such that a part of each long side is in contact with the protrusion of the rear frame.

5. The liquid crystal display apparatus according to claim 1,
characterized in that the fitting portions are through holes.

6. The liquid crystal display apparatus according to claim 2,
characterized in that the fitting portions are through holes.

7. The liquid crystal display apparatus according to claim 3,
characterized in that the fitting portions are through holes.

8. The liquid crystal display apparatus according to claim 4, characterized in that the fitting portions are through holes.

9. A liquid crystal display apparatus, comprising:

a rear frame formed by cutting and bending a metal plate, and including a rectangular bottom surface, rising portions vertically arranged respectively from both the long sides of the bottom surface, and support portions bent from the rising portions in parallel and outward;

a reflection sheet mounted so as to be in close contact with the bottom surface, the rising portions, and the support portions of the rear frame;

a backlight disposed above the reflection sheet, and having a U-shaped fluorescent light, a light frame including, on the underside, a holding portion for holding the backlight;

a rectangular diffusion plate disposed on the light frame and the support portions, and for diffusing light, and two rectangular diffusion sheets disposed in stacked relation on the diffusion plate;

a frame-like cell guide for pressing the outer peripheral portions of the diffusion plate with the diffusion sheet mounted thereon, and the diffusion sheets;

a liquid crystal cell disposed above the cell guide, and including a liquid crystal sealed between a pair of glass substrates each with a transparent electrode mounted thereon; and a frame-like bezel for pressing the cell guide and the liquid crystal cell, characterized in that the support portions of the rear frame have protrusions protruding upward by being cut and raised, the reflection sheet has through holes formed for the protrusions to penetrate therethrough at portions at which it is in close contact with the supporting portions, the light frame has a step on the top side, and the diffusion plate and the diffusion sheets disposed in stacked relation on the diffusion plate are configured such that each short side fits with the step of the light frame, and such that a part of each long side is in contact with the protrusion.

* * * * *